United States Patent
Fukuda et al.

(10) Patent No.: US 8,480,120 B1
(45) Date of Patent: Jul. 9, 2013

(54) TETHER CLIP

(71) Applicants: Honda Motor Co., Ltd., Tokyo (JP);
Illinois Tool Works Inc., Glenview, IL (US)

(72) Inventors: Takeru Fukuda, Saitama (JP); Takashi Honda, Saitama (JP); Toshihiko Tani, Saitama (JP); Mark R. Risdale, Dundas (CA); Mark O. Lepper, Oak Park, IL (US); Fumihito Ito, Yokohama (JP)

(73) Assignees: Honda Motor Co., Ltd., Tokyo (JP);
Illinois Tool Works, Inc., Glenview, IL (US)

( * ) Notice: Subject to any disclaimer, the term of this patent is extended or adjusted under 35 U.S.C. 154(b) by 0 days.

(21) Appl. No.: 13/723,335

(22) Filed: Dec. 21, 2012

(51) Int. Cl.
*B60R 21/16* (2006.01)

(52) U.S. Cl.
USPC .............. 280/728.2; 296/193.06; 24/453; 24/455

(58) Field of Classification Search
USPC ............ 280/728.2, 730.2; 296/1.08, 39.1, 296/193.06; 24/453, 455, 457, 458
See application file for complete search history.

(56) References Cited

U.S. PATENT DOCUMENTS

| | | | |
|---|---|---|---|
| 6,333,515 B1 | 12/2001 | Kubota et al. | |
| 6,394,695 B1 * | 5/2002 | Chausset | 403/397 |
| 6,431,585 B1 | 8/2002 | Rickabus et al. | |
| 6,565,117 B2 | 5/2003 | Kubota et al. | |
| 7,077,449 B2 | 7/2006 | Tokunaga | |
| 7,147,233 B2 | 12/2006 | Edmond | |
| 7,273,227 B2 | 9/2007 | Kawai et al. | |
| 7,290,795 B2 | 11/2007 | Kawai et al. | |
| 7,338,068 B2 * | 3/2008 | Kawai et al. | 280/728.2 |
| 7,374,200 B2 * | 5/2008 | Ikeda et al. | 280/728.2 |
| 7,717,458 B2 * | 5/2010 | Tsuge | 280/728.2 |
| 7,931,295 B2 * | 4/2011 | Inui et al. | 280/730.2 |
| 8,046,880 B2 * | 11/2011 | Katoh et al. | 24/458 |
| 8,316,513 B2 * | 11/2012 | DeJong et al. | 24/293 |
| 8,316,514 B2 * | 11/2012 | Sano | 24/297 |
| 2003/0094828 A1 * | 5/2003 | Nagamoto | 296/39.1 |

FOREIGN PATENT DOCUMENTS

| | | |
|---|---|---|
| JP | 09-315253 | 12/1997 |
| JP | 2000-344045 | 12/2000 |
| JP | 3422299 | 6/2003 |

* cited by examiner

*Primary Examiner* — Toan To
(74) *Attorney, Agent, or Firm* — Rankin, Hill & Clark LLP

(57) ABSTRACT

Tether clip locks garnish to vehicle body pillar, and when airbag body expands, tether clip releases garnish from vehicle body pillar without breaking garnish and prevents flying of garnish. Tether clip covers, from vehicle interior side, vehicle body pillar in which airbag body is housed, wherein tether clip locks garnish to vehicle body pillar. Tether clip includes: inner locking portion locked to pillar garnish; outer locking portion locked to vehicle body pillar; connecting portion for connecting inner locking portion and outer locking portion; and wire for tethering inner locking portion and outer locking portion to each other, wherein connecting portion is formed fragile against pressing force that is generated when airbag body presses garnish by expanding and developing, and wherein wire is wound around either inner locking portion or outer locking portion in direction around axis extending from inner locking portion to outer locking portion.

4 Claims, 6 Drawing Sheets

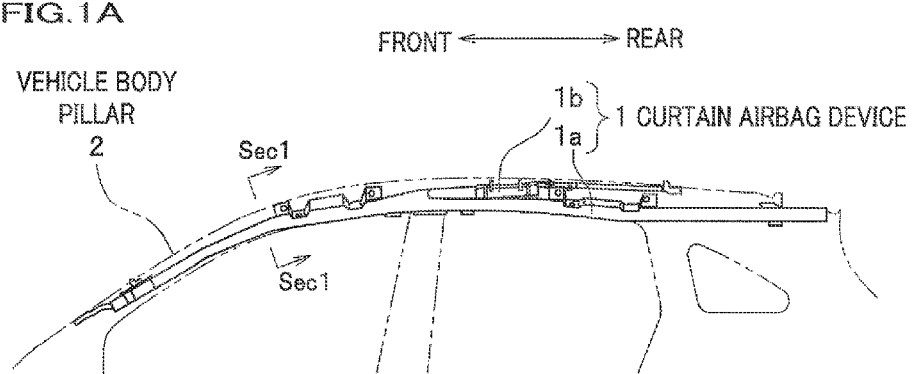
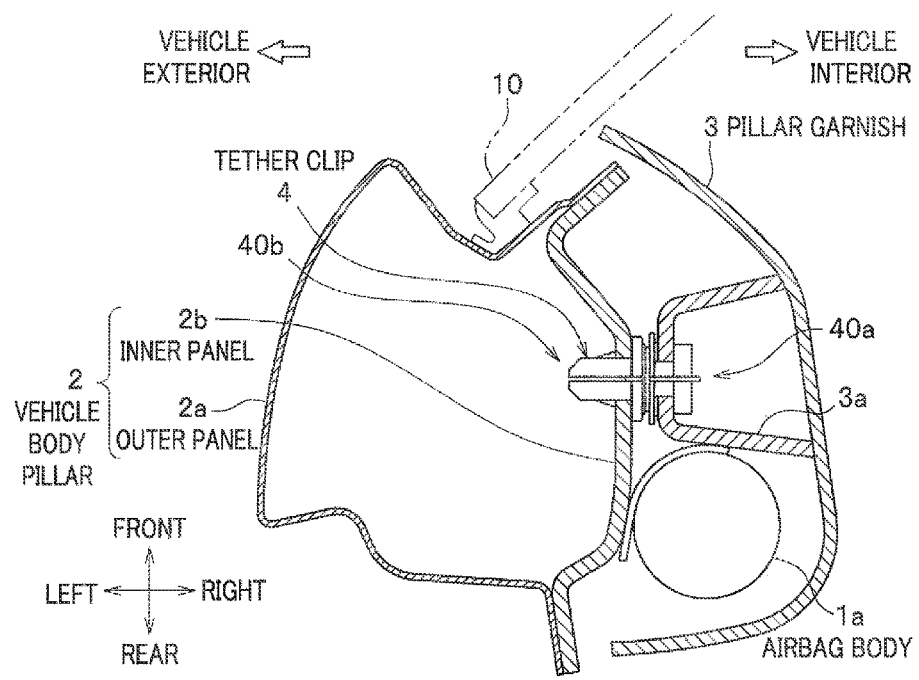

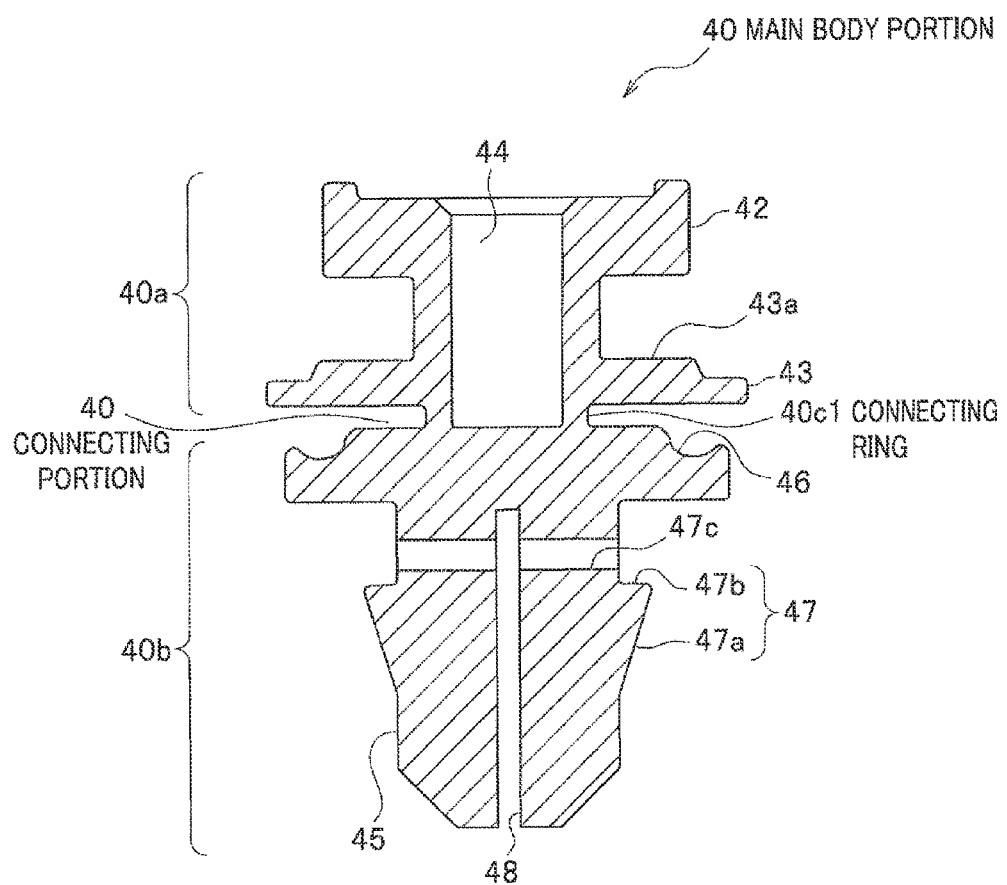

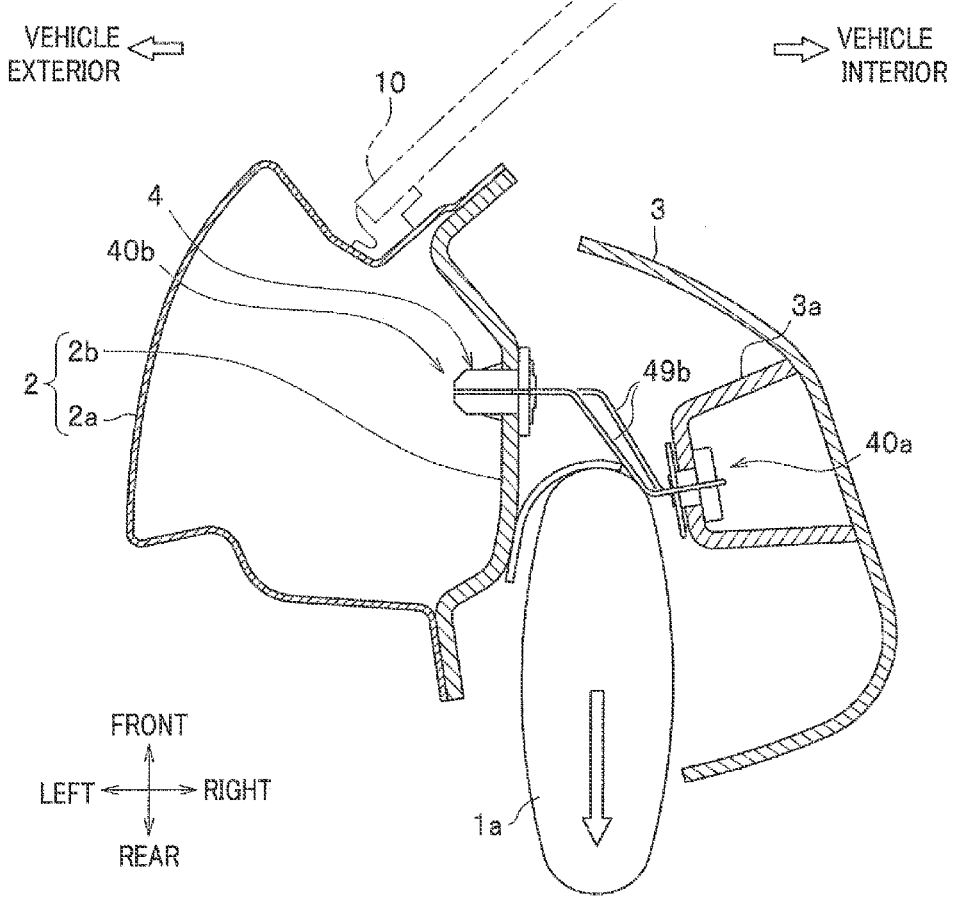

TETHER CLIP

BACKGROUND OF THE INVENTION

1. Field of the Invention

The present invention relates to a tether clip for locking a garnish to a vehicle body pillar.

2. Description of the Related Art

An airbag device (curtain airbag device) whose airbag body, which is packed in a vehicle body pillar of a vehicle and expands and develops at a lateral side in the vehicle interior, is formed such that the airbag body is housed between the vehicle body pillar and a garnish, and the vehicle interior side is covered by a pillar garnish.

The airbag body, to which gas is supplied from an inflator, expands and presses the pillar garnish to release the pillar garnish from the vehicle body pillar so that the airbag body develops into the vehicle interior from the gap formed between the vehicle body pillar and the pillar garnish.

Herein, the pillar garnish is desired to be locked to the vehicle body pillar so that the pillar garnish released from the vehicle body pillar is prevented from flying toward the vehicle interior.

For example, Patent Document 1 (JP2000-344045 A) discloses a fitting mechanism capable of preventing a pillar garnish from flying, the pillar garnish having been released from a vehicle body pillar by expansion of an airbag.

The fitting mechanism disclosed by Patent Document 1 is configured such that the pillar garnish is slidable along the axial direction of a locking member, and the pillar garnish, which has been released from the vehicle body pillar at a time of expansion of the airbag, slides along the axial direction of the locking member.

The fitting mechanism disclosed by Patent Document 1 is configured such that the pillar garnish is slidable only in one direction. Accordingly, there is a case that the direction in which the airbag presses the pillar garnish and the axial direction in which the pillar garnish is slidable are different form each other. In this case, as the pillar garnish is pressed along a direction different from the direction where the pillar garnish is slidable, the pillar garnish cannot satisfactorily slide. Accordingly, it is possible that the pillar garnish is broken, being pressed by the airbag.

SUMMARY OF THE INVENTION

In this situation, an object of the present invention is to provide a tether clip that can lock a garnish to a vehicle body pillar, release the garnish from the vehicle body pillar without breakage at a time of expansion of an airbag body, and also prevent the garnish from flying.

In a first aspect of the present invention, there is provided a tether clip for locking a garnish that covers, from vehicle interior side, a vehicle body pillar in which an airbag body is housed, wherein the tether clip locks the garnish to the vehicle body pillar, the tether clip including: a first locking portion locked to the garnish; a second locking portion locked to the vehicle body pillar; a connecting portion for connecting the first locking portion and the second locking portion; and a string-shaped member for tethering the first locking portion and the second locking portion to each other, wherein the connecting portion is formed fragile against a pressing force that is generated when the airbag body presses the garnish by expanding and developing, and wherein the string-shaped member is wound around either the first locking portion or the second locking portion in a direction around an axis extending from the first locking portion to the second locking portion.

According to the first aspect of the invention, the tether clip can be configured such that the connecting portion for connecting the second locking portion locked to the vehicle body pillar and the first locking portion locked to the garnish is formed fragile, and further the first locking portion and the second locking portion are tethered to each other by a string-shaped member. Accordingly, the tether clip can be configured such that when the airbag body housed in the vehicle body pillar expands and develops and thus presses the garnish, the tether clip easily breaks at the connecting portion. Further, the first locking portion and the second locking portion having been separated from each other by the breakage of the connecting portion can be made in a state of being tethered to each other by the string-shaped member. Still further, the string-shaped member can be set in a state of being wound around either the first locking portion or the second locking portion. For example, even in a state that the string-shaped member is loose, the loose string-shaped member can be wound around either the first locking portion or the second locking portion, and loosening of the string-shaped member can thereby be eliminated.

In a second aspect of the invention, the connecting portion is formed with a diameter smaller than diameters of the first locking portion and the second locking portion.

According to the second aspect of the invention, the connecting portion can be formed fragile with a diameter smaller than the diameters of the first locking portion and the second locking portion.

In a third aspect of the invention, the garnish is locked from the vehicle body pillar along an axial direction extending from the first locking portion to the second locking portion, and the connecting portion is formed fragile against the pressing force that acts in a direction different from the axial direction.

According to the third aspect of the invention, the tether clip can be configured such as to be easily broken by a pressing force acting in a direction different from the axial direction of the tether clip. Accordingly, the garnish can be easily released from the vehicle body pillar by the airbag body that expands and develops.

According to the invention, it is possible to provide a tether clip, wherein the tether clip locks a garnish to a vehicle body pillar, and when an airbag body expands, the tether clip releases the garnish from the vehicle body pillar without breaking the garnish and further prevents the tether clip from flying.

BRIEF DESCRIPTION OF THE DRAWINGS

FIG. 1A shows an airbag body housed in a vehicle body pillar and FIG. 1B is a cross-sectional view taken along Sec1-Sec1 in FIG. 1A, showing a state that a pillar garnish is locked by a tether clip to the vehicle body pillar;

FIG. 3 is a cross-sectional view taken along Sec2-Sec2 in FIG. 2;

FIG. 6 is a schematic view showing a state that the pillar garnish is pressed by the airbag body that is expanding, and is released from the vehicle body pillar.

DETAILED DESCRIPTION OF THE PREFERRED EMBODIMENT

Figure 2:
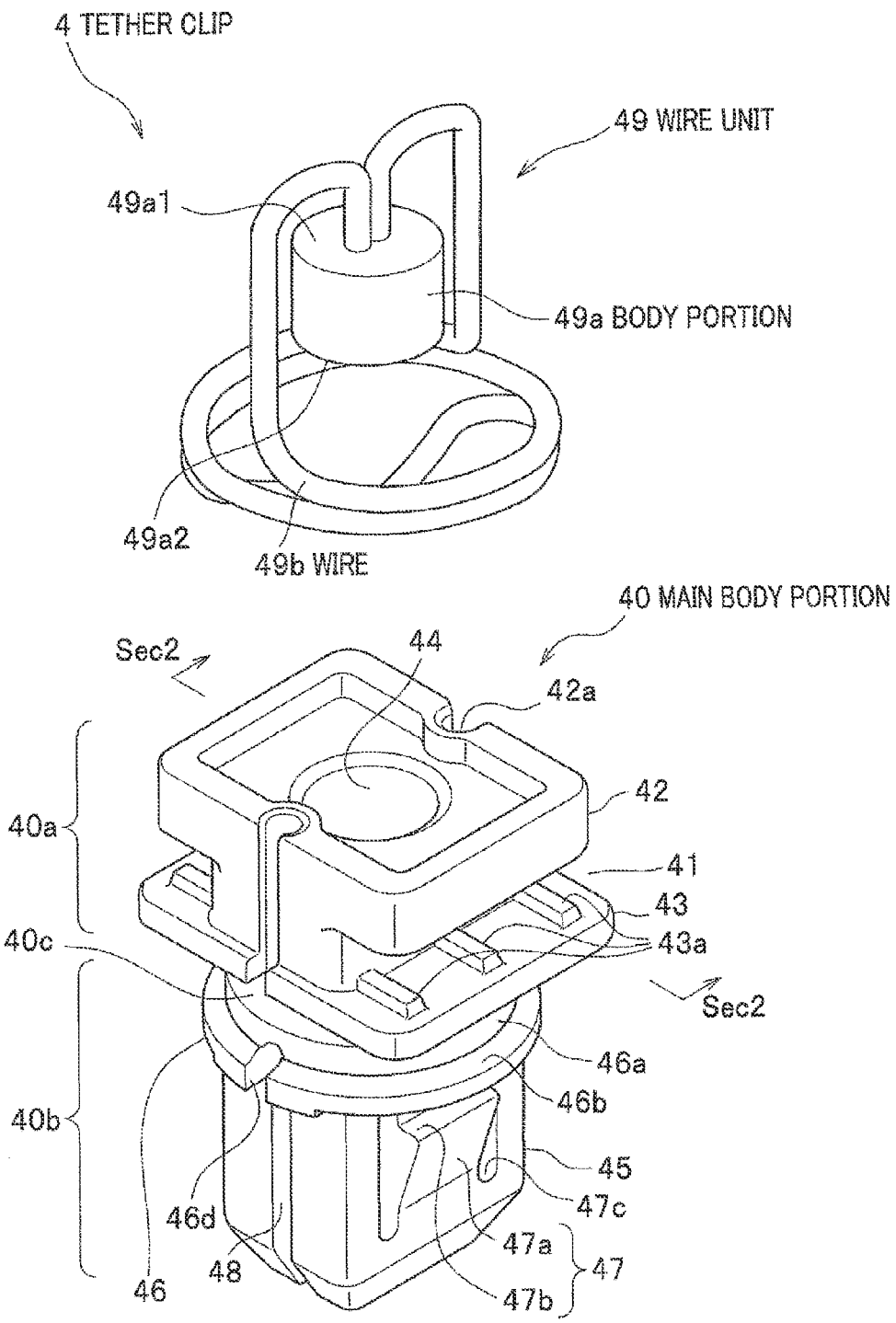
FIG. 2 is a perspective view of the main body portion and a wire unit of the tether clip.

A preferred embodiment for carrying out the present invention will be described below in detail, referring to the drawings, as appropriate.

FIGS. 1A and 1B show a curtain airbag device including a tether clip according to the present embodiment.

As shown in FIG. 1A, a curtain airbag device 1 is configured, including an airbag body 1a that expands and develops along a lateral side on the vehicle interior side, an inflator 1b for supplying gas (developing pressure) for expanding and developing the airbag body 1a, and a control section (not shown) that generates a signal to operate the inflator 1b. The airbag body 1a in a state of being folded and the inflator 1b are housed in a front pillar stretching in an upper/lower direction at the front of the vehicle and a roof side portion formed by stretching, of the front pillar, toward the rear of the vehicle. Hereinafter in the present embodiment, the front pillar and the roof side portion will be in combination referred to as a vehicle body pillar 2.

FIG. 1B is a cross-sectional view of the front pillar of the vehicle body pillar 2 on the left side of the vehicle, and shows a state that the front pillar supports, at the front, the left end of a front window 10.

As shown in FIG. 1B, the vehicle body pillar 2 has a double structure formed by attaching an inner panel 2b to the inner side (vehicle interior side) of an outer panel 2a expanding toward the outer side of the vehicle, by welding or the like, wherein the inner panel 2b is covered by a garnish (pillar garnish 3). The pillar garnish 3 has a shape expanding toward the vehicle interior side to form a space with the inner panel 2b. The airbag body 1a and the inflator 1b are housed in the space formed between the pillar garnish 3 and the inflator 2b.

The pillar garnish 3 is locked to the vehicle body pillar 2 by the tether clip 4. In the present embodiment, the inner panel 2b locks, by a substantially flat portion thereof facing the vehicle interior side, an outer locking portion 40b (second locking portion) of the tether clip 4. Further, the pillar garnish 3 is provided with a locking portion 3a facing the inner panel 2b, and locks, by the locking portion 3a, an inner locking portion 20a (first locking portion) of the tether clip 4.

The structures of the inner panel 2b and the pillar garnish 3 locked by the tether clip 4 will be described later in detail.

At the front pillar of the vehicle body pillar 2, the outer locking portion 40b of the tether clip 4 is locked by the inner panel 2b facing the right, and the outer locking portion 40b of the tether clip 4 is locked by the locking portion 3a facing the inner panel 2b.

Defining the direction from the inner locking portion 40a to the outer locking portion 40b as the axial direction of the tether clip 4, the tether clip 4 locks, at the front pillar, the pillar garnish 3 to the inner panel 2b with the axial direction as the substantial left/right direction.

As shown in FIG. 2, the tether clip 4 according to the present embodiment is configured, including a main body portion 40 and a wire unit 49.

The main body portion 40 according to the present embodiment has a structure of one piece formed by resin molding. The main body portion 40 is provided with the inner locking portion 40a on the side locked by the pillar garnish 3 (see FIG. 1B) and the outer locking portion 40b on the side locked by the inner panel 2b (see FIG. 1B), which are formed serially along the axial direction. The inner locking portion 40a and the outer locking portion 40b are connected by a connecting portion 40c, as shown in FIG. 3.

The structure of the tether clip 4 is not limited to one piece structure, and may be a structure in which an inner locking portion 40a and an outer locking portion 40b, which are individually formed, are connected by a connecting portion 40c.

The outer locking portion 40b is configured, including an inserting portion 45 substantially in a cuboid shape extending along the axial direction, and the end portion of the inserting portion 45 on the inner locking portion 40a side extends in a circular disc shape in the radial direction to form a wire winding portion 46. The wire winding portion 46 is structured by forming a flange shaped portion 46b extending in the radial direction from the axis around a winding body portion 46a having a cylindrical shape. A wire 49b (string-shaped member) forming the wire unit 49 is wound on the inner locking portion 40a side of the flange shaped portion 46b.

Further, the wire winding portion 46 functions as a restricting portion for restricting the locking position on the vehicle interior side when the tether clip 4 is locked by the inner panel 2b. Description about this in detail will be made later.

The shape of the inserting portion 45 is not limited to a cuboid shape. For example, the inserting portion 45 may be in a cylindrical shape. Further, the shape of the wire winding portion 46 also is not limited to a circular disc shape and may be extended in a rectangular shape in the radial direction of the inserting portion 45.

On each of the two side surfaces facing each other of the inserting portion 45 substantially in a cuboid shape (or substantially in a cylindrical shape), one snap click 47 is formed, wherein the snap click 47 is protruding substantially in a right triangle in a side view and has an inclined surface 47a extending outward from the side of the axial-direction end portion, in other words, the portion at the end along the axial direction, thereof (in more detail, the end portion thereof on the side where the wire winding portion 46 is not formed) toward the wire winding portion 46 side with a certain inclination, and has a facing portion 47b on the wire winding portion 46 side of the inclined surface 47a, the facing portion 47b facing the wire winding portion 46.

Incidentally, the axial-direction end portion of the inserting portion 45 may be formed thinner toward the tip end thereof.

Further, on the side surfaces where the snap clips 47 are not formed (in other words, the side surfaces perpendicular to the surfaces on which the snap clicks 47 are formed), a wire locking groove 48 is formed along the axial direction from the axial-direction end portion to the position of the wire winding portion 46, the wire locking groove penetrating toward the opposite side surfaces. The wire locking groove 48 has a function to lock the wire 49b, as described later.

Further, a penetrating groove 47c is formed, such as to reach the wire locking groove 48, in the periphery of the each snap click 47 except the axial-direction end portion side. With this structure, the each snap click 47 elastically deforms in the direction sinking from the surface of the inserting portion 45, with the axial-direction end portion side, where the penetrating groove 47c is not formed, as the fulcrum. By making the width of the gap between the wire winding portion 46 and the facing surface 47b equal to the thickness of the inner panel 2b (see FIG. 1B), the inner panel 2b can be locked between the wire winding portion 46 and the facing surface 47b. Further, a snap-fit mechanism is formed by the elastic deformation of the snap click 47, the deformation being in the direction sinking from the inserting portion 45, and the tether clip 4 can be easily locked to the inner panel 2b by snap-fitting.

The flange shaped portion 46b of the wire winding portion 46 is provided with recessed cut portions 46d at the positions where the wire locking groove 48 is formed. As the wire locking groove 48 penetrates through the two surfaces facing each other at the inserting portion 45, the two recessed cut portions 46d are formed at positions facing each other on the circumference of the wire winding portion 46 (in other words, positions deviated by 180 degrees from each other). The recessed cut portions 46d are formed by cutting the flange shaped portion 46b from the outer circumference in the radial direction, and preferably have a width that allows the wire 49b of the wire unit 49 to pass through.

Incidentally, in the present embodiment, the wire winding portion 46 is formed on the outer locking portion 40b, the wire winding portion 46 may be formed on the inner locking portion 40a. In this case, an arrangement can be made such that when the outer locking portion 40b side is released and the inner locking portion 40a and the outer locking portion 40b separate from each other, the wire 49b stretches toward the outer locking portion 40b side and is released from the wire winding portion 46.

The inner locking portion 40a is substantially in 'a sideways H-shape' in a side view from the side where the wire locking groove 48 of the outer locking portion 40b is formed, wherein engaging recessions 41 are formed that engage with the locking portion 3a (see FIG. 1B) of the pillar garnish 3, the engaging recessions 41 engaging with the locking portion 3a at the recessed portions formed between the end portion 42 formed on the axial-direction end portion side and a detachment preventing portion 43 formed on the outer locking portion 40b side. Incidentally, the detachment preventing portion 43 may be provided with protruding portions 43a protruding from the engaging recessions 41 side in an arbitrary shape. Such formed protruding portions 43a have a function to prevent detachment when the locking portion 3a of the pillar garnish 3 is in engagement with the engaging recessions 41.

The end portion 42 is open at a cylindrical wire fitting hole 44 formed along the axial direction from the axial-direction end portion. The body portion 49a of the wire unit 49 fittingly engages with the wire fitting hole 44 to become the fitting portion of the wire unit 49 to the main body portion 40.

Further, on the side surfaces of the inner locking portion 40a facing the same direction with the surfaces on which the wire locking groove 48 is formed at the inserting portion 45, wire guide grooves 42a are formed such as to extend along the axial direction from the axial-direction end portion to the connecting portion 40c. The wire guide grooves 42a are grooves formed to guide the wire 49b of the wire unit 49 along the axial direction toward the outer locking portion 40b when the wire unit 49 has been fitted to the main body portion 40, and are formed in one for each of the two side surfaces, facing each other, of the inner locking portion 40a.

The connecting portion 40c connects the inner locking portion 40a and the outer locking portion 40b, and is formed, as shown in FIG. 3, on the surface where the detachment preventing portion 43 of the inner locking portion 40a and the wire winding portion 46 of the outer locking portion 40b face each other, for example, as a connecting circular loop 40c1 concentric with the wire winding portion 46 in a circular disc shape. It is preferable that the connecting circular loop 40c1 has a diameter smaller than those of the inner locking portion 40a and the outer locking portion 40b and a thin thickness in the radial direction. For example, an arrangement can be made such that the depth of the wire fitting hole 44 reaches the connecting portion 40c, and the connecting circular loop 40c1, which is hollow and thin in thickness, is formed around the wire fitting hole 44.

The wire fitting hole 44 is required to have a diameter for fitting engagement with the body portion 49a of the wire unit 49 and can be formed with a diameter smaller than the diameters of the inner locking portion 40a and the outer locking portion 40b. Accordingly, the connecting circular loop 40c1 formed with a thin thickness around the wire fitting hole 44 can be formed with a smaller diameter than those of the inner locking portion 40a and the outer locking portion 40b and a thin thickness with respect to the radial direction.

With this structure, the connecting circular loop 40c1 is formed such as to be fragile against forces, which are in different directions and are input to the inner locking portion 40a and the outer locking portion 40b, and particularly, the connecting portion 40c is formed fragile.

As shown in FIG. 2, the wire unit 49 is formed by fitting the both end portions of one wire 49b to a cylindrical metallic body (body portion 49a) that fittingly engage with the wire fitting hole 44 of the tether clip 4. Further, the wire 49b has a ring shape as the both ends thereof are fitted to the body portion 49a. The both end portions of the wire 49b are fixed, being arrayed in the radial direction, substantially at the center of a fixing surface 49a1 at the axial-direction end portion of the body portion 49a. For example, an arrangement can be made such that the both ends of the wire 49b are inserted inside the fixing surface 49a1 perpendicularly to the fixing surface 49a1, and fixed to the body portion 49a by casting. In a state that the body portion 49a is fittingly engaged with the wire fitting hole 44 of the main body portion 40, the wire 49b is preferably sufficiently longer than the length of the inner locking portion 40a along the axial direction. The wire 49b can be made from metal, but the material is not particularly limited.

The tether clip 4 according to the present embodiment is configured, as described above, such that the wire unit 49 is set in the main body portion 40 of the tether clip 4.

Figure 4A:
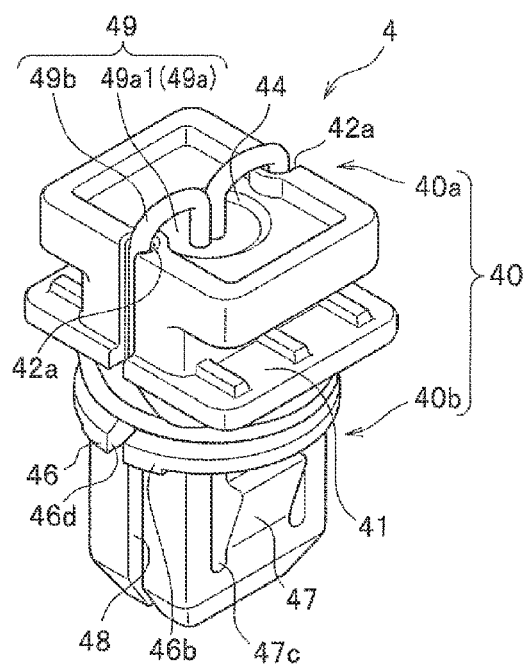
FIG. 4A is a perspective view showing the tether clip for which the wire unit is fitted to the main body portion.

As shown in FIG. 4A, the body portion 49a of the wire unit 49 is fittingly inserted and thus fixed to the wire fitting hole 44 of the main body portion 40 in a state that the fixing surface 49a1 faces the opening of the wire fitting hole 44. Herein, it is preferable that the direction, in which the both end portions of the wire 49b are arrayed on the fixing surface 49a1, is the direction of the two wire guide grooves 42a formed on the main body 40.

The wire 49b fitted to the body portion 49a extends from the both end portions fixed to the fixing surface 49a1 toward the respective sides of the two wire guide grooves 42a, and are inserted in the respective wire guide grooves 42a to be guided to the side of the outer locking portion 40b.

A method of fixing the body portion 49a of the wire unit 49 to the wire fitting hole 44 is not particularly limited. For example, the body portion 49a may be press fitted into the wire fitting hole 44, or the body portion 49a may be fixed to the wire fitting hole 44 by an adhesive agent or the like.

The wire 49b guided to the outer locking portion 40b side is inserted into the wire locking groove 48 from the axial-direction end portion of the insertion portion 45 and thus locked.

Incidentally, the width of the wire locking groove 48 is preferably set to a width with which the wire 49b can be inserted into the wire locking groove 48 and locked. Concretely, a width that is slightly smaller than the diameter of the wire 49b is preferable.

As described above, as the wire 49b is formed sufficiently longer than the length of the inner locking portion 40a along the axial direction, the wire 49b loosens when inserted into the wire locking groove 48.

In this situation, an arrangement is made such that the loosened part of the wire 49b is guided through the recessed cut portion 46d to the inner locking portion 40a side of the flange shaped portion 46b, and the wire 49b is wound around the wire winding portion 46 in a direction around the axis of the wire winding portion 46. By this arrangement, the loosening of the wire 49b can be eliminated.

As described above, the body portion 49a of the wire unit 49 is fixed to the inner locking portion 40a of the tether clip 4. The wire 49b is fitted at the both ends thereof to the body portion 49a to form a ring shape, and the part between the both end portions is locked by the wire locking groove 48 of the outer locking portion 40b. With this structure, the inner locking portion 40a and the outer locking portion 40b of the tether clip 4 become in a state of being tethered to each other by the wire 49b.

The inner locking portion 40a side of the wire winding portion 46 is open. When the body portion 49a of the wire unit 49 moves in the direction separating from the outer locking portion 40b, the wire 49b wound around the wire winding portion 46 stretches to be released from the wire winding portion 46.

Figure 4B:
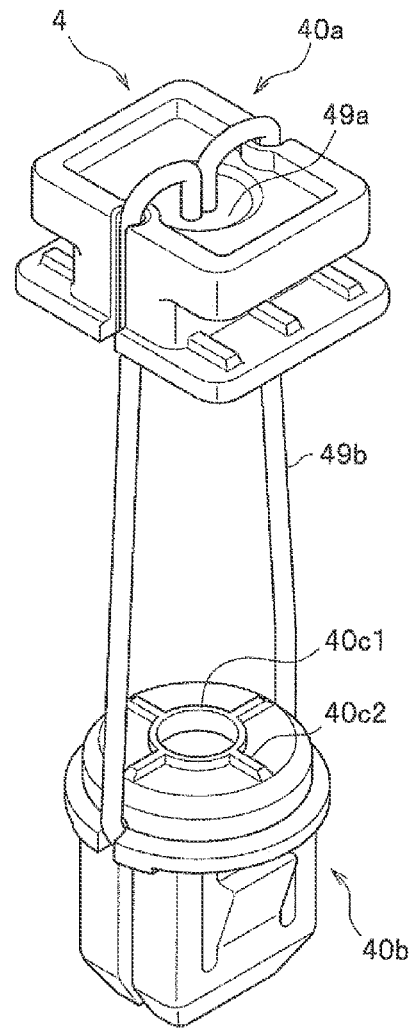
FIG. 4B shows an inner locking portion and an outer locking portion separated from each other in a state that the connecting portion is broken and the inner and the outer locking portions are tethered to each other by a wire.

As described above, the inner locking portion 40a and the outer locking portion 40b are connected by the connecting portion 40c (see FIG. 3) that is formed fragile. By a breakage of the fragile connecting circular loop 40c1 (see FIG. 3) of the connecting portion 40c, the inner locking portion 40a and the outer locking portion 40b easily separate from each other, as shown in FIG. 4B. When the inner locking portion 40a and the outer locking portion 40b separate from each other in such a manner, the wire 49b wound around the wire winding portion 46 stretches, maintaining the state that the inner locking portion 40a and the outer locking portion 40b are tethered to each other by the wire 49b.

Incidentally, a limb 40c2 radially formed from the connecting circular loop 40c1 is a reinforcing limb provided, as appropriate, to adjust the strength of the inner locking portion 40a and the outer locking portion 40b at the connecting portion 40c. The limb 40c2 is preferably provided, as necessary, for example, in case that a required strength cannot be obtained by a connecting portion 40c formed only by the connecting circular loop 40c1.

Needless to say, a structure, in which a limb 40c2 is not formed, may be applied. Further, as a modified example, the connection 40c may have a structure that is formed only by the limb 40c2 wherein the connecting circular loop 40c1 is not formed.

The tether clip 4 structured as shown in FIG. 4A is used as a locking member for locking the pillar garnish 3 to the vehicle body pillar 2, as shown in FIG. 1B. The curtain airbag device 1 is set between the pillar garnish 3 and the vehicle body pillar 2.

Figure 5:
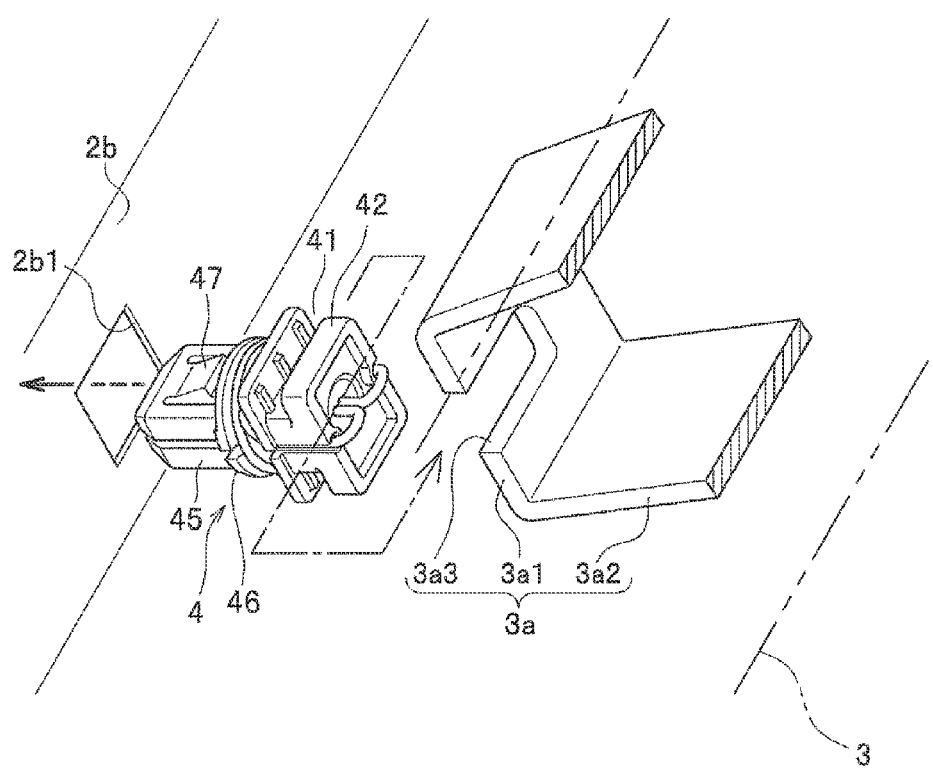
FIG. 5 is a perspective view showing an example of a structure in which the tether clip is locked to the vehicle body pillar and the pillar garnish.

For example, as shown in FIG. 5, the locking portion 3a for locking the tether clip 4 is formed on the vehicle body pillar 2 side (inner panel 2b side) of the pillar garnish 3.

The locking portion 3a is formed, including a locking surface 3a1 facing the inner panel 2b and a support portion 3a2 for supporting the locking surface 3a1 in a state of protruding the locking surface 3a1 toward the inner panel 2b side. Further, the locking surface 3a1 is provided with a slide recession 3a3 extending along the stretching direction of the pillar garnish 3. The slide recession 3a3 is formed such as to penetrate through the locking surface 3a1 along the thickness direction, and the one end along the stretching direction of the pillar garnish 3 is open. The slide recession 3a3 is formed in a size with which the engaging recessions 41 of the tether clip 4 engage.

By this structure, the engaging recessions 41 of the tether clip 4 engage with the slide recession 3a3 from the one end that is open, and the tether clip 4 is thereby locked to the pillar garnish 3.

The inner panel 2b is provided with an engaging hole 2b1 which the inserting portion 45 of the tether clip 4 penetrates through. The engaging hole 2b1 is preferably formed in a size slightly larger than the inserting portion 45. When the inserting portion 45 engages with the engaging hole 2b1, the snap clicks 47 protruding from the inserting portion 45 are elastically deformed along the sinking direction by the engaging hole 2b1. When the facing surfaces 47b (see FIG. 2) of the respective snap clicks 47 pass the position of the engaging hole 2b1, the snap clicks 47 return into the state of protruding from the inserting portion 45 by elastic force. With this structure, the tether clip 4 is locked to the inner panel 2b by snap-fitting.

Incidentally, insertion of the inserting portion 45 into the engaging hole 2b1 is restricted by the wire winding portion 46 extending in the radial direction. That is, the locking position of the tether clip 4 on the pillar garnish 3 side (the vehicle interior side) is restricted by the wire winding portion 46.

Further, though not shown, in case that the wire winding portion 46 is formed on the inner locking portion 40a (see FIG. 4A), an arrangement can be made such that a part of the inserting portion 45 protrudes in the radial direction, as appropriate, to restrict insertion of the inserting portion 45 into the engaging hole 2b1.

In such a manner, the outer locking portion 40b, on one side along the axial direction, of the tether clip 4 is locked to the inner panel 2b, and the inner locking portion 40a, on the other side along the axial direction, of the tether clip 4 is locked to the pillar garnish 3. Accordingly, the tether clip 4 locks the pillar garnish 3 along the axial direction from the inner panel 2b (the vehicle body pillar 2) side.

The inner panel 2b and the pillar garnish 3 according to the present embodiment have, structures as described above as an example, wherein the engaging recessions 41 (see FIG. 5) of the inner locking portion 40a of the tether clip 4 are locked to the pillar garnish 3, and the inserting portion 45 (see FIG. 5) of the outer locking portion 40b is locked to the inner panel 2b. That is, the inner locking portion 40a is locked to the pillar garnish 3, and the outer locking portion 40b is locked to the vehicle body pillar 2 (see FIG. 1B). With this structure, the pillar garnish 3 is locked to the vehicle body pillar 2, as shown in FIG. 1B, through the fragile connecting portion 40c (see FIG. 2) of the tether clip 4.

Incidentally, the structure in which the tether clip 4 is locked to the pillar garnish 3 is an example, and structure is not limited to one in which the engaging recessions 41 engage with the slide recession 3a3. Further, the structure in which the tether 4 is locked to the inner panel 2b is also an example, and structure is not limited to one in which locking by snap fitting is applied.

When the control section, not shown, has generated a signal to operate the inflator 1b (see FIG. 1A) upon sensing a shock, gas (a developing force) is supplied from the inflator 1b to the airbag body 1a (see FIG. 1B). The airbag body 1a expands by the supplied gas and presses the pillar garnish 3 (see FIG. 1B) from the inner panel 2 (see FIG. 1B) side. For example, the airbag body 1a, which is disposed at the front pillar stretching in the upper/lower direction at the front of the vehicle, is arranged to expand and develop backward to press the pillar garnish 3 backward, as shown in FIG. 6.

At this moment, a backward force (pressing force) acts on the inner locking portion 40*a* of the tether clip 4 through the pillar garnish 3. On the other hand, a forward force acts, through the connecting portion 40*c* (see FIG. 2), on the outer locking portion 40*b* locked to the front pillar of the vehicle body pillar 2, against the backward pressing force.

Further, as shown in FIGS. 3 and 4B, the connecting portion 40*c* is formed by the connecting circular loop 40*c*1 in a circular annular shape with a diameter smaller than the diameters of the inner locking portion 40*a* and the outer locking portion 40*b* and a thin thickness. With this structure, the connecting portion 40*c* can be made fragile also against a force acting in a direction different from the axial direction.

By applying forces to the inner locking portion 40*a* and the outer locking portion 40*b* in respective different directions, the engaging portion 40*c* can be easily broken.

Accordingly, in case that a pressing force to backward press the pillar garnish 3 is generated by expansion and development of the airbag body 1*a*, and as a reaction force, a forward force acts on the outer locking portion 40*b*, even if the force acting on the engaging portion 40*c* is in a direction different from the axial direction of the tether clip 4, the connecting portion 40*c* of the tether clip 4 can be easily broken, as shown in FIG. 6. Then, the pillar garnish 3 is released from the vehicle body pillar 2 to separate from the vehicle body pillar 2.

At this moment, the outer locking portion 40*b* of the tether clip 4 remains in a state of being locked to the inner panel 2*b*, while the inner locking portion 40*a* separates from the inner panel 2*b* in a state of being locked to the pillar garnish 3.

However, the inner locking portion 40*a* and the outer locking portion 40*b* are maintained in a state of being tethered to each other by the wire 49*b*. Accordingly, the outer locking portion 40*b* locked to the inner panel 2*b* and the inner locking portion 40*a* locked to the pillar garnish 3 are maintained in the state of being tethered to each other by the wire 49*b*.

With this structure, the state that the inner panel 2*b* and the pillar garnish 3 are tethered to each other by the wire 49*b* is maintained, and the pillar garnish 3 released from the inner panel 2*b* is prevented from flying toward inside the vehicle interior.

In a state that the inner locking portion 40*a* and the outer locking portion 40*b* are connected, the wire 49*b* is in a state of winding around the wire winding portion 46. Accordingly, even though the wire 49*b* is long, it is prevented that the wire 49*b* is in a loose state and extends between the inner panel 2*b* and the pillar garnish 3. If a wire 49*b* in a loose state extends between the inner panel 2*b* and the pillar garnish 3, the airbag body 1*a* may be disturbed from expanding and developing. However, a wire 49*b* in a state of winding around the wire winding portion 46 does not disturb expanding and developing of the airbag body 1*a*. Therefore, in this structure, the length of the wire 49*b* can be made long, and can be set to a suitable or desired length.

Further, the connecting portion 40*c* of the tether clip 4 formed as the connecting circular loop 40*c*1 (see FIG. 3) in a circular annular shape breaks when the pillar garnish 3 is pressed by the airbag body 1*a* that expands and develops. Thus, the tether clip 4 can be broken by expansion and development of the airbag body 1*a* without fail, and the pillar garnish 3 itself can thereby be prevented from breaking.

Further, for the tether clip 4 according to the present embodiment, the inner locking portion 40*a* and the outer locking portion 40*b* are formed in one piece structure. Accordingly, the tether clip 4 can be easily manufactured.

Still further, as occurrence of backlash between the inner locking portion 40*a* and the outer locking portion 40*b* is prevented, the pillar garnish 3 can be locked to the inner panel 2*b* without a backlash. Occurrence of noises which could be caused by backlash between the inner panel 2*b* and the pillar garnish 3 can be surely prevented.

Incidentally, the connecting portion 40*c* (see FIG. 3) is formed by the connecting circular loop 40*c*1 (see FIG. 3) with a smaller diameter than the diameters of the inner locking portion 40*a* and the outer locking portion 40*b* and a thin thickness. Accordingly, the connection portion 40*c* is formed fragile also against a force acting along the axial direction. Consequently, even in a case that a pressing force by the airbag body 1*a* (see FIG. 1B) acts in the axial direction of the pillar garnish 3 (see FIG. 1B), the tether clip 4 (see FIG. 1B) can be easily broken.

The airbag body 1*a* (see FIG. 1B) disposed at a roof side that stretches in the front/rear direction of the vehicle is arranged such as to expand and develop downward, and a pressing force accordingly downward acts on the pillar garnish 3 (see FIG. 1B).

In this case, a downward force (a pressing force) acts on the inner locking portion 40*a* (see FIG. 1B) of the tether clip 4, and as a reaction force, an upward force acts on the outer locking portion 40*b* (see FIG. 1B). That is, forces in different directions act on the inner locking portion 40*a* and the outer locking portion 40*b*, and the tether clip 4 is thereby broken at the connecting portion 40*c*.

In such a manner, similarly to the case at the front pillar, even at the roof side stretching in the front/rear direction of the vehicle, the pillar garnish 3 can be easily released from the vehicle body pillar 2 by expansion and development of the airbag body 1*a*.

What is claimed is:

1. A tether clip for locking a garnish that covers, from vehicle interior side, a vehicle body pillar in which an airbag body is housed, wherein the tether clip locks the garnish to the vehicle body pillar, the tether clip comprising:
   a first locking portion locked to the garnish;
   a second locking portion locked to the vehicle body pillar;
   a connecting portion for connecting the first locking portion and the second locking portion; and
   a string-shaped member for tethering the first locking portion and the second locking portion to each other,
   wherein the connecting portion is formed fragile against a pressing force that is generated when the airbag body presses the garnish by expanding and developing,
   and wherein the string-shaped member is wound around either the first locking portion or the second locking portion in a direction around an axis extending from the first locking portion to the second locking portion.

2. The tether clip according to claim 1, wherein the connecting portion is formed with a diameter smaller than diameters of the first locking portion and the second locking portion.

3. The tether clip according to claim 1,
   wherein the garnish is locked from the vehicle body pillar along an axial direction extending from the first locking portion to the second locking portion,
   and wherein the connecting portion is formed fragile against the pressing force that acts in a direction different from the axial direction.

4. The tether clip according to claim 2,
   wherein the garnish is locked from the vehicle body pillar along an axial direction extending from the first locking portion to the second locking portion, and wherein the connecting portion is formed fragile against the pressing force that acts in a direction different from the axial direction.

* * * * *